(Model.)
F. W. EICHENS.
CELESTIAL GLOBE.
No. 247,811. Patented Oct. 4, 1881.
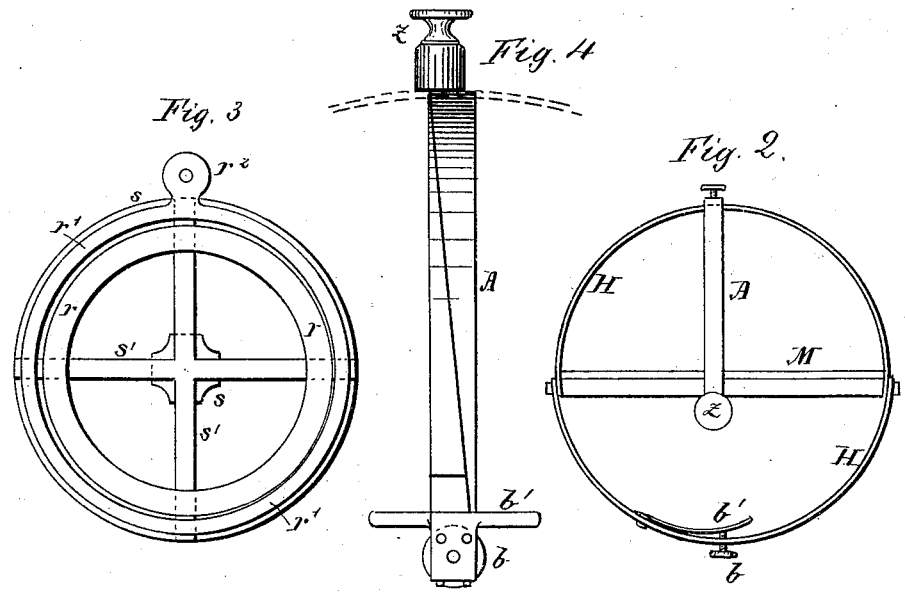
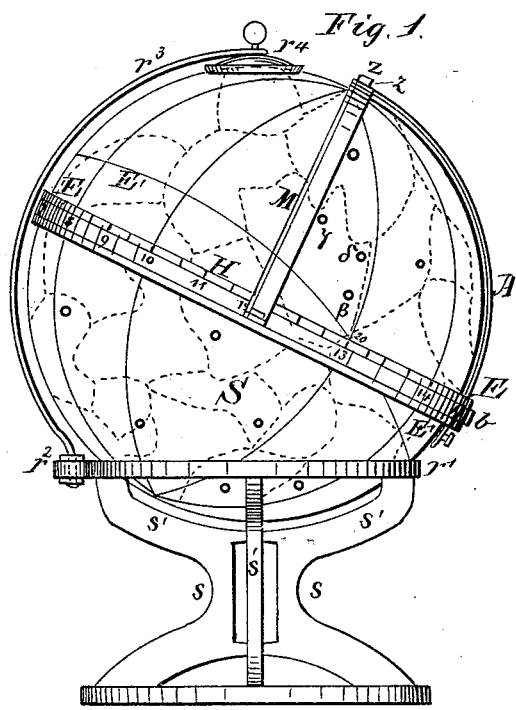
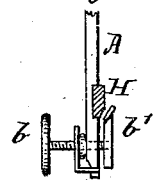
Witnesses.
H. D. McElwee
H. A. Daniels
Inventor
Frédéric W. Eichens
per Henry Orth
att'y

UNITED STATES PATENT OFFICE.

FREDERIC W. EICHENS, OF PARIS, FRANCE.

CELESTIAL GLOBE.

SPECIFICATION forming part of Letters Patent No. 247,811, dated October 4, 1881.

Application filed August 16, 1881. (Model.) Patented in France May 24, 1878.

*To all whom it may concern:*

Be it known that I, FREDERIC WILLIAM EICHENS, a citizen of France, residing at Paris, in the Department of the Seine and Republic of France, have invented certain new and useful improvements in astronomical apparatus for assisting the navigation or direction of route of ships and other vessels, also applicable as a school apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has for its object to provide a nautical instrument of extremely simple construction and easily handled, by means of which nearly all the complex nautical problems may be solved in a few minutes, and without calculation, or, at least, with very little calculation, so that those who have only the most elementary education in astronomy and are little used to handling astronomical instruments may be enabled to solve the same after a little practice.

By means of this simple apparatus the following nautical problems may be solved in a few minutes: first, the name, azimuth, and approximate altitude of stars for determining the positions of a vessel at a given time; second, the variations of the compass; third, the name of a star the altitude of which has been observed; fourth, the sidereal hour when the altitude of a star, its position in the east or west, and the latitude in which the vessel is sailing at the time are known; fifth, the angle of the route from a given point to another, and the distance between these points; sixth, an account of most of the circumstances attending the movement of the stars above the horizon from any place; seventh, the above observations may also be made by the sun, moon, or the planets.

With the rapidity of the movements of vessels propelled by steam has arisen a necessity for taking frequent bearings to avoid any great deviation from the true course.

Every skilled naval officer is aware of the difficulties encountered in making frequent observations, especially at night or by twilight, when the sky is partially obscured.

Every opportunity is now taken to make observations by the stars, and the possibility of making such observations almost at any time and with rapidity is of the utmost importance to masters of vessels that run on schedule time as most of the trans-atlantic lines now do, or are expected to do.

Having thus briefly stated the necessity of making frequent observations at sea and the importance of such observations, I will now describe my improved apparatus, by means of which these observations may be made within a comparatively short time and with great facility.

To this end it is necessary to have a configuration of the heavens, then to determine the azimuth and altitude of a star within one degree at a given hour, and, having determined these, it will only be necessary to bring the zero of the alidade to the ascertained altitude, sight the rhumb-line indicated by the azimuth when the star will immediately be found in the field of the instrument, and there remains nothing to be done but to establish its contact with the horizon. These problems belong to spherical geometry, and several instruments have been constructed to solve them, all of which are defective to such an extent as to prevent their general use. To solve such problems it is absolutely necessary that the instrument should exactly represent the surfaces and the geometrical lines existing in the problem, and, further, that said surfaces and lines should be capable of assuming, relatively to each other, all the positions required by the solution of said problems, and it is in this arrangement of elements that my invention consists.

I thus obtain an instrument of the simplest construction, for the very reason that it interprets the nature of things exactly by reproducing nature, if I may so express myself, which does things in the simplest possible manner.

Let us now see what is the nature of these surfaces and geometrical lines that enter into the nautical problems that may be solved by the instrument and their relative movements. On the one hand we must have a celestial sphere, S, upon which should be delineated with great exactitude the position of the stars, the center of which sphere coincides with that of the earth. On the other hand the geometrical lines, by means of which the position of the observer is ascertained upon the terrestrial globe. These lines are represented in the instrument by a great circle representing the horizon H, the meridian M of the place, and the azimuth circle A of the stars. By means of these lines the zenith of the observer is determined, and consequently the spot or place upon earth where he is at the time. The great circle or horizon H lies entirely before him. On the contrary, he sees only that half of the meridian M at right angles to and above the horizon, while the azimuth circle A is arranged to rotate around the vertical of the place, and, finally, the zenith Z is at the center of the half-meridian above the horizon. The celestial sphere is practically stationary, while the horizon, the meridian, the azimuth, and zenith are constantly moving by reason of the diurnal rotation of the earth and the positions the observer may assume upon this planet.

In the accompanying drawings, Figure 1 is an elevation of the instrument; and Figs. 2, 4, and 5 are detail views of the horizon circle, the meridian, and vertical; and Fig. 3 is a plan view of the stand.

S represents the sphere, made of any suitable material, preferably of metal, and hollow. The whole surface of the sphere should be of a light color, and in practice I cover it with white paper, so that all indications of a darker color—say black—may be readily read by lamp-light. Upon this white surface are accurately delineated the stars of the first and second magnitude, the only ones of which the observations should be made, and these I indicate preferably by means of black circles, the diameter of these circles for the stars of the first magnitude being greater than that for the stars of the second magnitude. I provide each star with its proper affix, (Greek letter or sign,) the small white spot within the black circle indicating the exact position of the star, or nearly so.

The limits of the constellations I indicate preferably by black dotted lines; and the equator, the ecliptic, the meridians, and poles I indicate by full black lines, as plainly shown in Fig. 1.

The equator E E is divided into four minute spaces that correspond to the degree. Ciphers (not indicated in the drawings) are placed near the equatorial line in the boreal and austral hemispheres, the former indicating the divisions corresponding to twenty minutes, the latter indicating the hours. Of course it will be understood that the order of the hour will be from 0 to 24, going from east to west, the 0 hour being also the twenty-fourth hour corresponding to the vernal point, and serves as a starting-point in counting the right ascensions. The meridians M M are laid out by two hours. The ecliptic E' E' passes necessarily through the divisions of twelve and twenty-four hours.

This sphere rests loosely, so as to be moved in any direction upon ring $r$, Fig. 3, of a diameter equal to, or nearly equal to, the half-diameter of the sphere. This ring is rigidly secured to the arms or braces $s'$ of the stand $s$; and to prevent the sphere from being thrown from its stand I employ a second ring, $r'$, around the ring $r$, and I preferably mount said ring $r'$ on stand $s$, so as to rotate freely around ring $r$. Though this is not absolutely necessary, yet I have found it more convenient.

The ring $r'$ is provided with a lug or projection, $r^2$, that serves as a bearing for a curved arm, $r^3$, that is capable of rotation in said bearing, and said rod carries at its upper free end a pivoted bell-shaped cap, $r^4$, which, when in proper position, engages and holds the sphere against displacement by any violent motion of the vessel.

The stand $s$ is secured by screws, or otherwise, to any suitable support on board ship.

H is the great circle, the upper edge of which represents the horizon; M, the meridian, and A the azimuth circle or vertical, all of which are of a diameter equal to, or practically equal to, that of the sphere, and are fitted thereto with just sufficient looseness to admit of their being moved on the sphere, and all of them are made of metal, preferably brass. One-half of the great circle is graduated from 0° to 180°. The other half need not be graduated, as will be seen presently.

The meridian M, attached at right angles to the great circle, is graduated from 0° to 90° in opposite directions from its center or zenithal point, which is 0°, and to facilitate the reading of the graduations I preferably bevel that edge of the meridian that bears the graduations.

Upon the zenithal point of the meridian will necessarily be the pivot of the vertical or azimuthal circle, and this point is therefore indicated by the pivot-screw $z$, around which the vertical A rotates. The other extremity of the vertical slides upon the great circle, and when the parts are brought in the desired position they are fixed in place upon the sphere upon which they simply rest by means of a spring, $b'$, and a set-screw, $b$, Figs. 2 and 4. The vertical is graduated from 0° to 86°, starting from the great circle or horizon.

The described arrangement of circles and arcs permits, first, to trace the arcs of the great circle upon the sphere, and to measure their lengths; second, to measure the angles formed by two great circles. The relation of these circles and arcs to the sphere being that of the graduated rule and protractor to plane geometry. As will be readily seen, all problems relating to spherical triangulation may be solved, and we have, therefore, not only a navisphere, but also what I term a "metrosphere," or nautical instrument in its very simplest form.

When referring hereinafter to the pivot of the vertical A, I shall denominate it "zenithal screw" to facilitate the description.

Not only may all the nautical problems, as well as those of spherical triangulation, be solved by the apparatus, but all the circumstances attending the movements of the stars above the horizon, may be observed from any place.

It will also be seen that this apparatus is admirably adapted for public schools, inasmuch as the teacher may, with the greatest facility, practically demonstrate to the pupils all the various problems of navigation, and impart to them a knowledge of astronomy, which can now be obtained in the higher grades of schools only.

I will now give a few examples illustrating the method of solving nautical problems by means of the instrument.

Find the names, the azimuths, and the approximate altitudes of stars to be observed.

To determine the true ship's hour V, obtain in the usual manner—

First. The change in longitude, $\delta G$, since noon within 15' or 20', and divide by 15. The result will be the change in minutes of time.

Second. The right ascension of the sun, AR, at noon, Greenwich time, neglecting the seconds. Add this to the above time or change in longitude, whether east or west. If the number of hours obtained exceeds 24, deduct the excess, and the result will be the sidereal hour, $S_1$, of the place.

Third. The estimated latitude $L_e = \pm L \pm \delta L$. L is the latitude at noon. The signs + or − indicate respectively a boreal or austral latitude, and + or − $\delta L$ correspond respectively to a change of north or south latitude.

$S_1$ and $L_e$ being calculated, disengage the sphere from rod $r^3$. Then place it in position so that the sidereal hour on the equator is nearly in front of you and the approximate parallel of $L_e$ near the vertical of the place. Then move the zenithal screw $z$ near the latitude of the place, so that the meridian M will pass through the pole and the sidereal hour $S_1$. By slight movement of the sphere, move the meridian exactly upon the sidereal hour $S_1$ on the equator and pole. Then move the meridian M from north to south, or, inversely, to bring the exponent of latitude $L_e$ on the meridian to coincide as nearly as possible with the equator, taking care that the meridian intersects the pole. Then fix the parts by means of the spring and screw $b\ b'$. In this position of the instrument all the indicated upon the hemisphere above the horizon will be found above the same, and nothing is then more easy than to find their altitudes and azimuths at the hour V by simply bringing the vertical A in position to intersect the star the azimuth and altitude of which it is desired to obtain, and which may then be read off on the horizon and vertical respectively. Thus I may illustrate how to find the sidereal hour, the altitude in the east or west of a star, the latitude of the place being known, also to measure and read off the angles of great circles, &c., problems that will, however, be readily solved by those acquainted with this class of instruments.

Though I prefer to make the sphere, circles, and arcs of brass, I wish to have it understood that I do not desire to limit myself to the use of this material, as other materials equally good may be employed; nor do I wish to limit myself to a white ground or paper cover for the sphere. Although well adapted for purposes of navigation, yet when the instruments are employed for educational purposes, and are frequently and sometimes carelessly handled, and upon which, for purposes of demonstration, circles and arcs may have to be laid out often, it will be found more advantageous to coat the sphere with a material not readily deteriorated, and from which such marks may be washed off or otherwise readily removed without injury to the surface or the permanent delineations thereon.

Having now described my invention, what I claim is—

1. In an astronomical instrument, a celestial sphere free to be moved in any direction whatsoever, a horizon and meridian capable of a like motion with or independently of the sphere, as set forth.

2. In an astronomical instrument, a celestial sphere free to be moved in any direction whatsoever, a horizon, meridian, and a vertical capable of a like motion with or independently of the sphere, as set forth.

3. In an astronomical instrument, a celestial sphere or globe and a stand upon which said sphere rests loosely, and means to clamp the sphere upon the stand, as set forth.

4. In an astronomical instrument, a sphere loosely mounted upon a stand, a horizon, meridian, and vertical loosely mounted upon the sphere, and means to clamp the horizon, meridian, and vertical or verticals to said sphere, as set forth.

5. In an astronomical instrument, a sphere loosely mounted upon a stand, a horizon, meridian, and a vertical loosely mounted upon the sphere, and means to clamp the horizon, meridian, and vertical to the sphere, and the latter to the stand or support, as set forth.

6. In an astronomical instrument, the combination, with the sphere S, of the horizon circle H, the set-screw $b$, and spring $b'$, substantially as and for the purpose specified.

7. In an astronomical instrument, the combination of the sphere S, the stand $s$, rings $r\ r'$, and the rod $r^3$, carrying the bell-shaped cap $r^4$, all arranged and operating substantially as and for the purpose specified.

In testimony whereof I affix my signature in presence of two witnesses.

FREDERIC WILLIAM EICHENS.

Witnesses:
ROBT. M. HOOPER,
E. GAGER.